(No Model.)
J. H. WAY.
GARMENT STRETCHER.
No. 538,564. Patented Apr. 30, 1895.
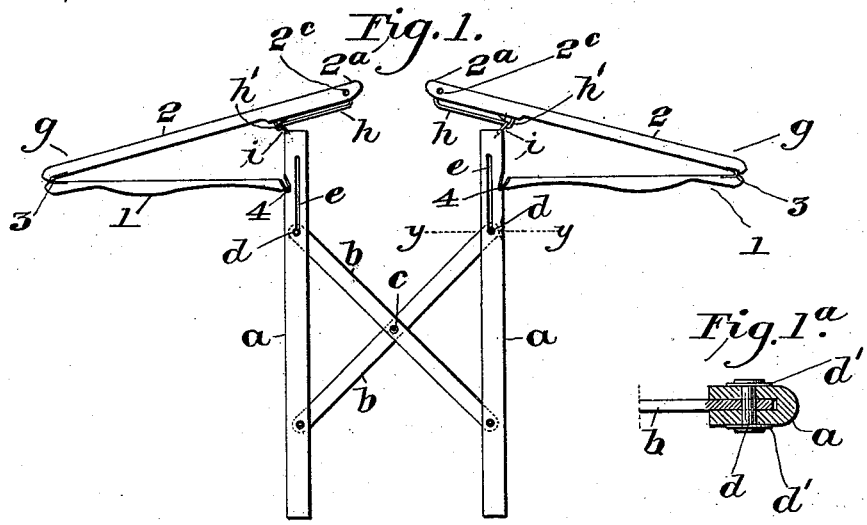
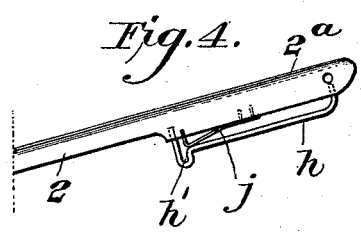 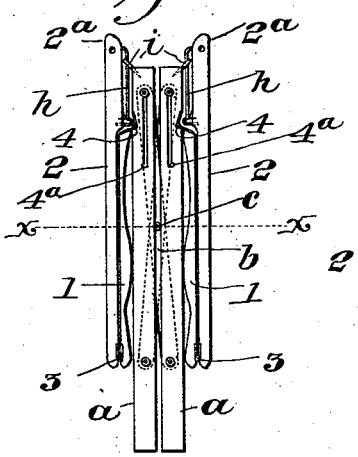 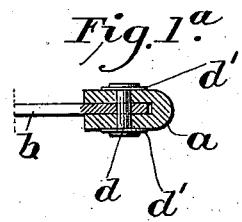
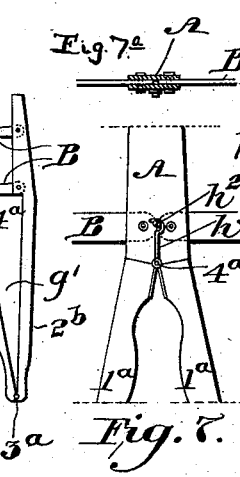
Witnesses:
John R. Nolan
H. Alford Boggs
Inventor.
John Howard Way,
per Joshua Pusey.
Attorney.
THE NORRIS PETERS CO., PHOTO-LITHO., WASHINGTON, D. C.

UNITED STATES PATENT OFFICE.

JOHN HOWARD WAY, OF PHILADELPHIA, PENNSYLVANIA.

GARMENT-STRETCHER.

SPECIFICATION forming part of Letters Patent No. 538,564, dated April 30, 1895.

Application filed September 27, 1893. Serial No. 486,601. (No model.)

*To all whom it may concern:*

Be it known that I, JOHN HOWARD WAY, a citizen of the United States, and a resident of the city and county of Philadelphia and State of Pennsylvania, have invented certain new and useful Improvements in Garment-Stretchers, of which the following is a full, clear, and exact description, reference being had to the accompanying drawings, in which—

Figure 1 is a side elevation of my "garment-stretcher" for undershirts, the device being shown in the open position. Fig. 1ª is a transverse section, enlarged, as on the line $y\,y$, Fig. 1. Fig. 2 is a view of the device collapsed or folded. Fig. 3 is a transverse section, enlarged, as on the line $x\,x$, Fig. 2. Fig. 4 is a detail of one of the shoulder sections. Figs. 5 and 6 are views similar to Figs. 1 and 2, respectively, of the device in a form applicable to drawers. Fig. 7 is a detail showing the connections of certain parts. Fig. 7ª is a detail view of the parts shown in Fig. 7 as seen in plan.

This invention relates to those devices termed "garment stretchers and driers," which are designed to support washed goods while being dried and thereby preserve the shape of the garments; my object being to construct a device in the form of a jointed frame work which may be readily folded up into comparatively small compass for convenience of packing and transportation, and which frame-work when opened out or expanded will assume approximately the proper lines of the garment which is applied thereto.

To this end, the invention consists in the novel construction and combination of parts, all as hereinafter described and pointed out in the appended claims.

Referring to Figs. 1 to 4, both inclusive, of the drawings, wherein the invention is represented as embodied in a form adapted for use in the drying of woolen undershirts: $a, a$ are two main, parallel, vertical bars united by a pair of pivotally connected arms, $b$, by which said main bars may be moved toward or away from each other and remain parallel. These arms, $b$, are preferably constructed of overlapping strips pivoted together midway of their length, as at $c$, their lower ends being pivotally attached to the bars $a$, and their upper ends being provided with laterally projecting studs, $d$, fitted to longitudinal guide slots, $e$, in the bars $a$. Hence, as said bars are drawn apart, or moved together, the arms open or close as the case may be, the studs thereon thus playing in the vertical guide slots $e$.

The inner edges of bars $a$ are preferably grooved longitudinally, the pivoted ends of the arms, $b$, being fitted to the grooves, $f$, thus formed, whereby, when the bars, $a$, are moved toward each other, said arms will register with the grooves and thus permit the bars, $a$, to be brought together, or nearly so. In this instance, the studs, $d$, on the upper ends of the arms, $b$, are ordinary rivets passed through the slots and headed with washers, $d'$, to retain them therein.

The upper ends of the vertical bars, $a$, are provided with hinged members, $g$, adapted to receive and sustain the respective arm and shoulder portions of the garment. These members each consist of two sections, 1, 2, which are hinged together at their outer ends, as at 3. The inner end of the lower section, 1, is hinged to the outer edge of the adjacent vertical arm at the point 4, below the top of the latter, whereby said section may be swung out at right angles to the arm, or substantially so. The inner end of the section 2 is provided on its under edge with a guide rod, $h$, to which is fitted a screw-eye, $i$, on the outer corner of the vertical bar; said rod, $h$, being, in the present instance, composed of a piece of wire with its ends upturned and driven into the section. The lower or outer portion of this rod, $h$, is bent to form a loop, $h'$, which is adapted to receive the eye when the lower section, 1, is moved into the horizontal position, the upper section thus occupying the inclined position indicated in Fig. 1. When the parts are in this position the free end, 2ª, of the upper section projects inwardly beyond the vertical bar, $a$, to form a support for the shoulder of the garment; the outwardly extending portion of said section, in conjunction with the horizontal or lower section, being adapted to enter and sustain the arm portion of the garment. The outer edges of the sections are properly shaped to accommodate the form of the arm of the garment to which they are to be applied.

To the lower edge of the extension, $2^a$, is secured one end of a spring, $j$, the free end of which is suitably bent, as shown, to bear upon the opposed edge of the guide rod at a point just in front of the off-set, $h'$. This spring thus serves as a guard to maintain the guide-eye in engagement with the off-set. While it thus prevents accidental displacement of the outwardly extended sections, yet the spring may be readily pressed upward so as to free the eye and permit said sections to be folded together and against the vertical arms, as illustrated in Fig. 2.

It will be seen that the guide-rod and the eye maintain the parts in their relative positions during the opening and the closing of the sections.

I usually provide the lower outer edge of each slot, $e$, with a notch, $4^a$, with which the proximate sliding stud on the diagonal arm, $b$, engages when the vertical bars are opened, thereby locking the arm in place.

The extensions, $2^a$, of the respective sections, 2, may be perforated near their free ends, as at $2^c$, to receive hooks or other devices, whereby the frame, with the garment thereon, may be suspended. These ends, of course, project into the open neck portion of the garment.

In Figs. 5, 6 and 7 of the drawings, to which reference will now be had, the invention is shown as embodied in a form for use in drying drawers. In this construction, although the parts are necessarily differently formed and arranged, to adapt them to the difference in the shape of the garments, yet the essential features of the invention are common to both constructions.

$g, g'$ represent the leg members of the frame-work, which members do not differ materially in construction from the arm members of the first described form. These leg members each comprise two sections, $1^a$, $2^b$, hinged together at their lower ends, as at $3^a$. The inner sections, $1^a$, $1^a$, of the two members are hingedly connected at their upper ends, as at $4^a$. The upper portions of the outer sections, $2^b$, are extended upwardly above the united ends of the inner sections, $1^a$, said upper portions being adapted to support the hip and waist parts of the drawers. These upper portions are pivotally connected with a vertically disposed central piece, A, by means of arms, B, which serve the same purpose as the diagonal arms ($b$) in the first described construction. The lower portion of the central piece is provided with a fixed stud, $h^2$, and the joint of the inner sections, $1^a$, is provided with a pivoted hook or latch, $h^3$, which is adapted to engage this stud. When the members are drawn outward, and this hook engages with the stud, $h^2$, as illustrated in Fig. 5, the parts are locked in the open position, which is the position they occupy when the frame is in actual use. When, however, the hook is disengaged from the stud, the parts may be closed into comparatively small compass, as illustrated in Fig. 6.

I claim as my invention—

1. In a garment stretcher, the combination with a body portion comprising the parallel bars having a loose connection between them whereby they are permitted to move toward and away from each other, of a pair of lateral, folding limb-portion stretching sections loosely connected each at one end with one of said bars, a hinge connecting the opposite ends of said sections, and a latch device carried by said sections and arranged to be brought into fastening relation with co-operating means on said body portion to secure the stretcher in its distended form, substantially as specified.

2. In a garment stretcher, the combination with a pair of vertical bars, having guide slots in their upper portions, of the two oblique, crossed arms pivotally secured at one end to the respective bars, and at their opposite ends to studs or pins working in said slots, said arms being pivoted one with the other at the point of crossing, and a laterally extending, folding limb-stretching section pivotally secured to each of said bars independently of said arms, substantially as specified.

3. In a garment stretcher, the combination with the vertical bars, and the two oblique crossed arms having each a pivotal connection with one of said bars at one end, and a pivotal and sliding connection with the said bars at the opposite end, said arms being pivoted one to the other at the point of crossing and constituting the only connection between the bars, and shoulder sections composed each of two hingedly connected parts, one of which is pivotally connected to one of said bars and the other of which has a sliding guide connection with the same, substantially as specified.

4. In a garment stretcher, the combination with the vertical bars grooved on their inner edges, the overlapping pivoted arms fitted to the grooves in said bars and provided with pivotal and sliding connections with the latter, the two part shoulder members pivotally connected together and with said bars, the guide eyes in the latter and the guide rods on the shoulder members, substantially as specified.

In testimony whereof I have hereunto affixed my signature in the presence of two subscribing witnesses.

JOHN HOWARD WAY.

Witnesses:
JOHN R. NOLAN,
H. ALFORD BOGGS.